No. 770,422. PATENTED SEPT. 20, 1904.
E. E. DRURY & W. E. STORER.
NUT LOCK.
APPLICATION FILED MAR. 10, 1904.
NO MODEL.

Witnesses
F. A. Barrow
M. A. Schmidt

E. E. Drury } Inventors
W. E. Storer
by Milo B. Stevens & Co. Attorneys.

No. 770,422. Patented September 20, 1904.

UNITED STATES PATENT OFFICE.

ELMER E. DRURY AND WORLEY E. STORER, OF GLOUSTER, OHIO.

NUT-LOCK.

SPECIFICATION forming part of Letters Patent No. 770,422, dated September 20, 1904.

Application filed March 10, 1904. Serial No. 197,578. (No model.)

*To all whom it may concern:*

Be it known that we, ELMER E. DRURY and WORLEY E. STORER, citizens of the United States, residing at Glouster, in the county of Athens and State of Ohio, have invented new and useful Improvements in Nut-Locks, of which the following is a specification.

Our invention relates to improvements in nut-locks, and has for its object a simple and efficient device of this kind which can be readily applied to and used on any ordinary bolt; and with this object in view the invention consists in an arrangement and combination of parts hereinafter described and claimed.

Figure 1:
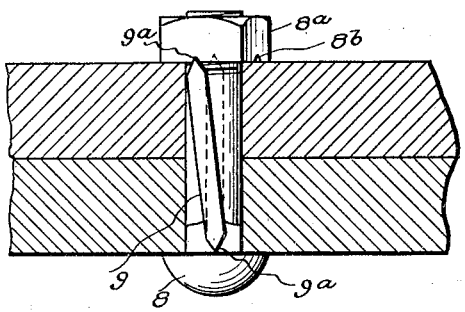
Figure 2:
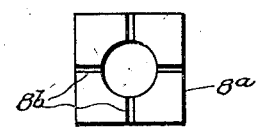
Figure 3:
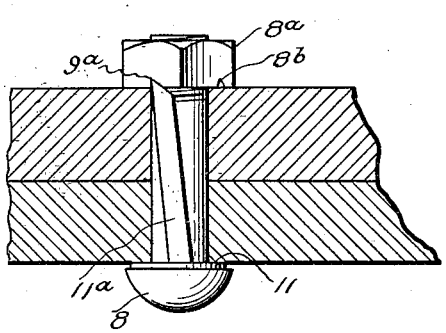

In the accompanying drawings, Figure 1 is an elevation of the device, showing the application thereof. Fig. 2 is a bottom plan view of the nut. Fig. 3 is a modification, and Fig. 4 is a perspective view, of the locking-spring shown therein.

Referring specifically to the drawings, the bolt is indicated at 8 and the nut at $8^a$. The base of the latter has a series of notches or ratchet-teeth $8^b$ engageable by the point of a locking-spring 9. In the form shown in Fig. 1 this spring comprises a thin flat piece of spring metal which is pointed at each end, as at $9^a$. The spring is placed in the bolt-hole with one of the points $9^a$ against the bolt-head and is of such length that the other point $9^a$ projects slightly from the nut end of the bolt-hole. In this position the spring extends parallel with the axis of the bolt-hole, as shown by dotted lines in Fig. 1. When the nut is screwed on the bolt, the notches $8^b$ thereon will be engaged by the point $9^a$, and as the distance between the base of the nut and the bolt-head decreases the spring will be forced sidewise across the axis of the bolt-hole, as shown in Fig. 1, whereby it will be tightly jammed between the nut and the bolt-head and will securely hold the nut from backing off the bolt by the engagement of the pointed end $9^a$ with the notches in the base of the nut. While the strength of the spring will be sufficient to hold the nut against jarring loose, it will not be stiff enough to prevent the nut from being forcibly turned off the bolt by a wrench. The notches in the nut may be dispensed with if the nut is made of soft metal, as the point of the spring will bite into the same sufficiently to hold it.

Figure 4:
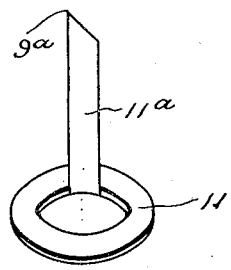

The form shown in Figs. 3 and 4 comprises a perforated disk or washer 11, having a thin flat spring $11^a$ projecting outwardly from the edge of the perforation and provided with a pointed end similar to the other forms heretofore described. The disk is securely held under the bolt-head, as shown in Fig. 3, so that the spring $11^a$ cannot slip out of place. Said spring operates in the same manner as the spring 9.

The form shown in Figs. 1 and 2 is best adapted for a bolt having a squared shank near the head thereof, while the form shown in Figs. 3 and 4 can be used on a bolt which is round throughout its entire length.

Having thus described our invention, what is claimed as new, and desired to be secured by Letters Patent, is—

A nut-lock comprising a spring-strip extending through the bolt-hole and jammed between the bolt-head and nut, its ends being in contact with said bolt-head and nut respectively.

In testimony whereof we have signed our names to this specification in the presence of two subscribing witnesses.

ELMER E. DRURY.
WORLEY E. STORER.

Witnesses:
C. A. VERNON,
R. P. DRUGGEUS.